US008682717B2

(12) United States Patent  
Maw et al.

(10) Patent No.: US 8,682,717 B2
(45) Date of Patent: Mar. 25, 2014

(54) SYSTEM AND METHOD FOR PROCESSING FIELD 55 CUSTOMER EXCLUSIVE DATA

(75) Inventors: Brian Maw, Belmont, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 528 days.

(21) Appl. No.: 12/150,861

(22) Filed: Apr. 30, 2008

(65) Prior Publication Data

US 2009/0276344 A1 Nov. 5, 2009

(51) Int. Cl.
G06Q 30/00 (2012.01)

(52) U.S. Cl.
USPC ............ 705/14.23; 705/14.25; 705/14.26; 705/14.27; 705/14.51; 705/14.61

(58) Field of Classification Search
USPC ............ 705/39, 40, 41, 44, 64, 65, 67, 78, 705/14.23, 14.25, 14.26–14.32, 14.51, 705/14.53, 14.61, 14.62; 235/379, 380
See application file for complete search history.

(56) References Cited

U.S. PATENT DOCUMENTS

| | | | | |
|---|---|---|---|---|
| 7,013,289 | B2 * | 3/2006 | Horn et al. | 705/14.51 |
| 7,318,049 | B2 | 1/2008 | Iannacci | |
| 7,356,541 | B1 | 4/2008 | Doughty | |
| 7,774,229 | B1 * | 8/2010 | Dernehl et al. | 705/14.16 |
| 7,962,390 | B2 | 6/2011 | Maw et al. | |
| 8,010,428 | B2 | 8/2011 | Maw et al. | |
| 8,498,898 | B1 * | 7/2013 | Kogen et al. | 705/14.3 |
| 2002/0116344 | A1 * | 8/2002 | Kinoshita et al. | 705/65 |
| 2003/0080186 | A1 | 5/2003 | McDonald et al. | |
| 2003/0144935 | A1 | 7/2003 | Sobek | |
| 2004/0128243 | A1 | 7/2004 | Kavanagh et al. | |
| 2004/0210481 | A1 * | 10/2004 | Quinlan et al. | 705/14 |
| 2005/0080726 | A1 | 4/2005 | Krajewski et al. | |
| 2005/0080728 | A1 * | 4/2005 | Sobek | 705/39 |
| 2006/0136299 | A1 * | 6/2006 | Ruhmkorf | 705/14 |
| 2008/0090597 | A1 * | 4/2008 | Celik et al. | 455/466 |
| 2008/0103968 | A1 | 5/2008 | Bies et al. | |
| 2009/0006203 | A1 * | 1/2009 | Fordyce et al. | 705/14 |
| 2009/0135728 | A1 * | 5/2009 | Shen et al. | 370/250 |
| 2009/0266881 | A1 | 10/2009 | Hammad | |
| 2009/0271211 | A1 | 10/2009 | Hammad | |
| 2009/0276344 | A1 * | 11/2009 | Maw | 705/30 |
| 2009/0289112 | A1 * | 11/2009 | Bonalle et al. | 235/380 |
| 2011/0078010 | A1 * | 3/2011 | Postrel | 705/14.25 |

FOREIGN PATENT DOCUMENTS

JP 2000099832 A * 4/2000

OTHER PUBLICATIONS

Corresponding PCT Application No. PCT/US2009/042202 International Search Report and Written Opinion dated Jun. 24, 2009.
International Search Report from Corresponding International Application No. PCT/US09/46402, mailed Jul. 23, 2009.

* cited by examiner

Primary Examiner — Mamon Obeid
(74) Attorney, Agent, or Firm — Kilpatrick Townsend & Stockton LLP

(57) ABSTRACT

A payment device, method, and apparatus configured to parse customer exclusive data from a payment device or financial transaction data.

21 Claims, 9 Drawing Sheets

4000

55

| Tag # | 9F02 | 9F37 | 9F36 | 9F10 | 9F26 | 9F7C | 9F6E |
|---|---|---|---|---|---|---|---|
| Field Name | Amount Authorized | Unpredictable Number | Application Transaction Count (ATC) | Issuer Application Data (IAD) | Application Cryptogram | Customer Exclusive Data | Form Factor Identifier |
| | 3010 | 3020 | 3030 | 3040 | 3050 | 4000 | 6000 |

| 4100 | 4200 | 4300 |
|---|---|---|
| TLV Format | | |
| Tag (Position Number) | Length | Data |

FIG. 4A

| Application Cryptogram Example for CVN 17 in Field 55 | | |
|---|---|---|
| 9F26 | 8 | 123F76A4319C4321 |
| 4100 | 4200 | 4300 |

| Device Indicator Value | Form Factor | Description |
|---|---|---|
| 0 | Full-size standard card (non-contactless) | Device indicator value initiated from a full-size magnetic stripe card |
| 1 | Full-size standard card | Device indicator value initiated from a full-size contactless card (contactless) MSD chip and magnetic stripe) |
| 2 | Standard mini card (non-contactless) | Device indicator value initiated from a standard mini card |
| 3 | Contactless mini card | Device indicator value initiated from a contactless mini card (contactless MSD chip and magnetic stripe) |
| 4 | Micro tag | Device indicator value initiated from the contactless MSD chip of a Micro tag |
| 5 | Mobile device | Device indicator value initiated from the contactless MSD chip of a mobile device |
| 6 | Alternate card user | Reserved for alternate card user |
| 7 | Alternate card user | Reserved for alternate card user |
| 8 | Alternate card user | Reserved for alternate card user |
| 9 | Reserved | Reserved for future payment device |

FIG. 6

SYSTEM AND METHOD FOR PROCESSING FIELD 55 CUSTOMER EXCLUSIVE DATA

BACKGROUND

1. Field of the Invention

Aspects of the present disclosure relate in general to financial services. Aspects include an apparatus, system, method and computer-readable storage medium configured to read and parse customer exclusive data from a payment card or device during a financial transaction. The customer exclusive data may be integrated with a financial transaction fraud prevention engine.

2. Description of the Related Art

Traditionally, credit card issuers offer many different types of incentives to encourage card holders to use credit cards for their purchases. For example, some credit card issuers offer card holders frequent-flyer miles, cash back, or other combinations of rewards and rebates.

At the same time, issuers lack the ability to present card holders instant reward information.

SUMMARY

Described embodiments include a system and method configured to parse and process customer exclusive data from a payment card or device in a financial transaction. Despite the fact that the industry does not capture or utilize such information, one aspect of the invention includes the insight that utilizing customer exclusive data in a financial transaction affords issuers and merchants to offer payment card users targeted promotions and increases the security of payment card transactions.

A financial processing system includes a cardholder database which stores customer account information. A network interface receives a financial transaction data packet from an acquirer. A data parser extracts a data field from the financial transaction data packet. The data field may be formatted in Tag-Length-Value format. The data parser further parses a data tag from the data field, extracting card customer exclusive data from the data tag, and a primary account number from the financial transaction data packet. A customer data manager configured queries the cardholder database with the primary account number to determine whether there is a database customer exclusive data associated with the primary account number. When the card customer exclusive data and the database customer exclusive data do not match, the customer data manager substitutes the card customer exclusive data with the database customer exclusive data in a financial transaction.

BRIEF DESCRIPTION OF THE DRAWINGS

FIGS. 4A and 4B illustrating storage of customer exclusive data on a payment card or device in Tag-Length-Value format.

FIG. 6 depicts device form factor information stored on a payment card or device.

DETAILED DESCRIPTION

Although the payment card industry does not currently parse or use customer exclusive data stored on a payment card or device in a financial transaction, one aspect of the present invention includes the insight that tracking customer exclusive data in a financial transaction would be useful to consumers, card issuers, and card payment processors at the time of the transaction. First, card holders will be able to use customer exclusive data to identifier themselves, and therefore decrease fraudulent transactions. Issuers and payment processors may also use customer exclusive data to enable incentives for card holders at the time of the transaction, instead of days or weeks afterwards.

For the purposes of this document, a payment card may be any credit, debit, or financial transaction identification card capable of storing customer exclusive data.

A payment device may be any credit, debit, or financial transaction device, mobile phone, or identification card capable of storing customer exclusive data for use in a financial transaction.

A financial transaction is any operation involving a payment device, whether a payment, reimbursement, or any other interaction using a payment device. Financial transactions may include credit, debit, or charge transactions.

Embodiments of the present invention include a system, method, and computer-readable storage medium configured to parse or use customer exclusive data stored on a payment card or device in a financial transaction.

Figure 1:
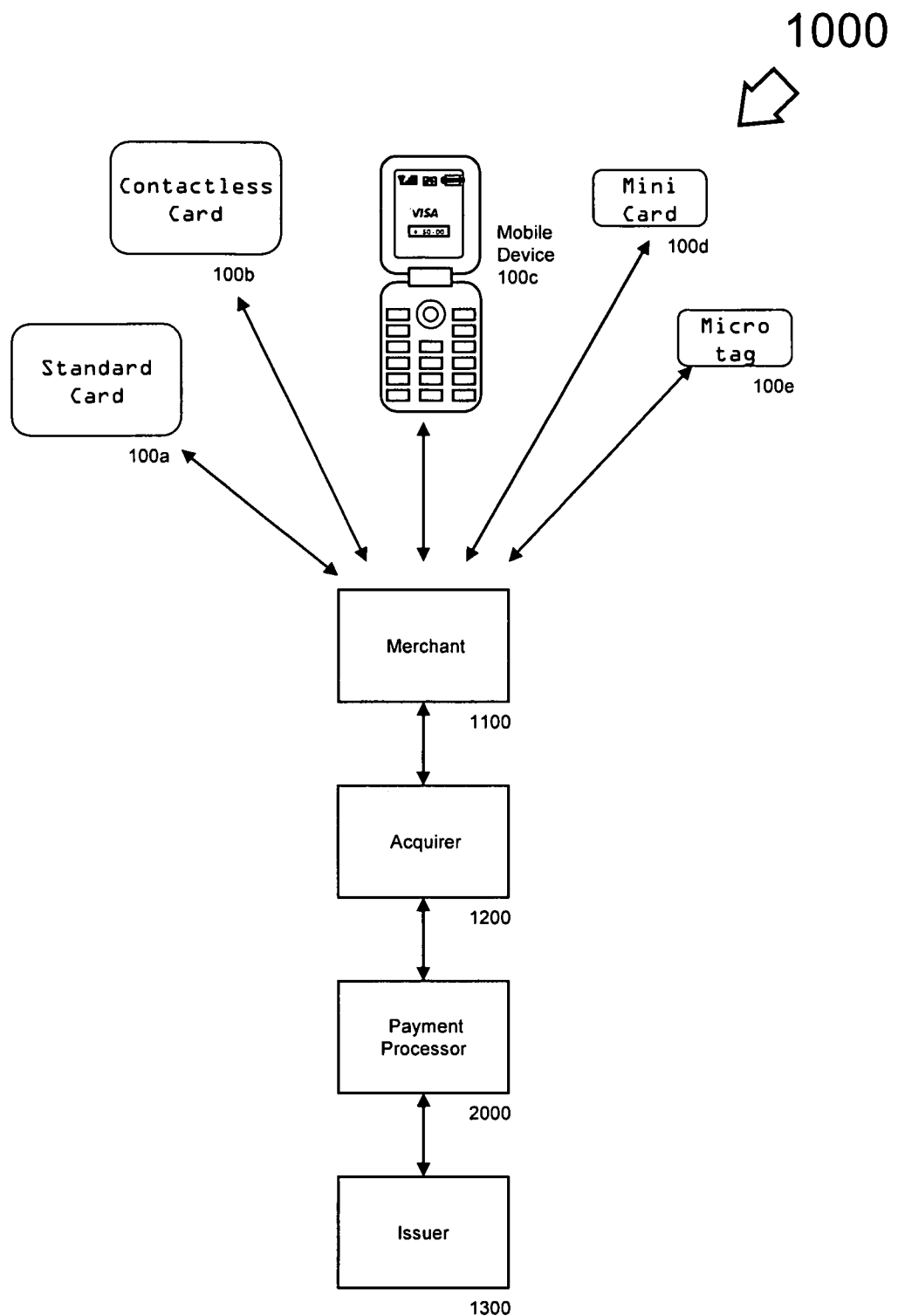
FIG. 1 illustrates an embodiment of a system configured to parse and process customer exclusive data from a payment card or device in a financial transaction.

Turning to FIG. 1, this figure depicts system 1000, configured to parse or use customer exclusive data stored on a payment card or device in a financial transaction, constructed and operative in accordance with an embodiment of the present invention. In this example, payment device 100 may be any credit, debit, or charge device. Examples include, but are not limited to, a standard payment device 100a, a radio frequency (also known as "contactless" or "pay wave") payment device 100b, a mobile phone device 100c, a mini-card 100d, micro tag 100e, payment fob, or any other payment device known in the art. It is understood that embodiments of the present invention may be extended to identify and track future payment devices.

When the consumer uses the payment device 100 at a merchant 1100 to pay for a product or service, the merchant 1100 contacts an acquirer 1200 (for example, a commercial bank) to determine whether the consumer is credit worthy or the account has sufficient funds on the card to pay for the transaction. The acquirer 1200 forwards the details of the payment transaction to a payment processor 2000 or payment card issuing bank 1300 ("the issuer") for processing.

Payment processor 2000 may be any payment network known in the art. Examples of payment networks include Visa™, MasterCard™, and American Express™.

Issuer 1300 may be any financial institution or organization that issues the payment device 100.

Figure 2A:
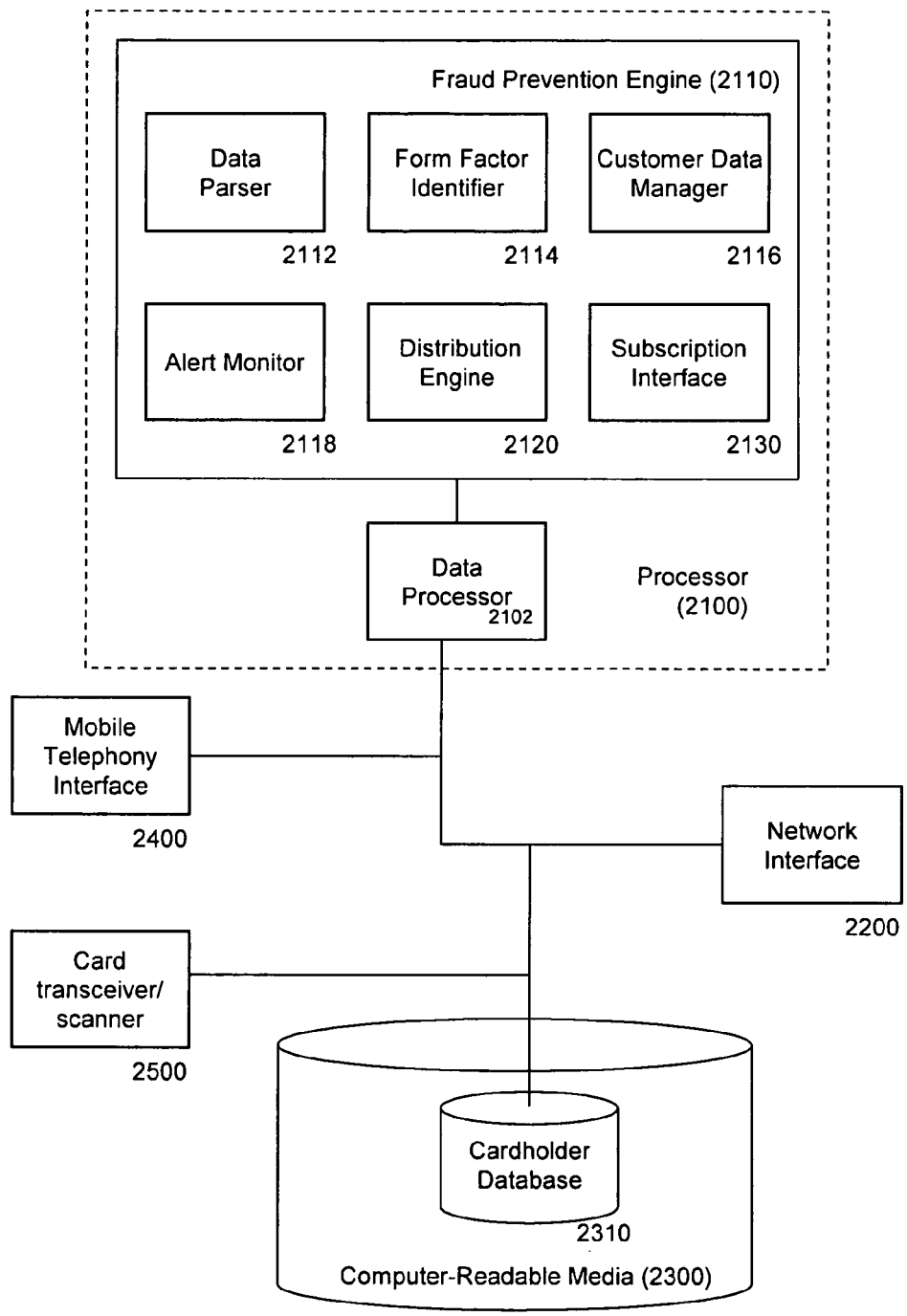
FIGS. 2A and 2B are a block diagram of a payment processor configured to parse and process customer exclusive data from a payment card or device in a financial transaction.

Embodiments will now be disclosed with reference to a payment processor 2000 depicted in FIG. 2, constructed and operative in accordance with an embodiment of the present invention.

Payment processor 2000 is configured to parse or use customer exclusive data stored on a payment card or device 100 in a financial transaction.

It is well understood by those in the art, that the functional elements of FIG. 2 may be implemented in hardware, firmware, or as software instructions and data encoded on a computer-readable storage medium 2300.

Payment processor 2000 may run a multi-tasking operating system (OS) and include at least one processor 2100. Processor 2100 may be any central processing unit (CPU), microprocessor, micro-controller, computational device or circuit known in the art.

As shown in FIG. 2, processor 2100 is functionally comprised of a fraud prevention engine 2110 and data processor 2102. Fraud prevention engine 2110 may further comprise: data parser 2112, form factor identifier 2114, customer data manager 2116, alert monitor 2118, distribution engine 2120, and subscription interface 2130. Data parser 2112 is configured to receive and parse financial transaction data. Form factor identifier 2114 enables fraud prevention engine 2110 to determine the form factor of a payment device 100. Customer data manager 2116 is any structure, function, program or module that enables fraud prevention engine 2110 to communicate with a cardholder database 2310. Alert monitor 2118 allows fraud prevention engine 2110 to generate fraud alerts. Distribution engine 2120 is configured to generate transaction report for issuers 1300. Subscription interface 2130 allows issuers 1300 to subscribe to reports generated by distribution engine 2120. These structures may be implemented as hardware, firmware, or software encoded on a computer readable medium, such as storage media 2300. The functions of these elements are described in greater detail below.

Figure 2B:
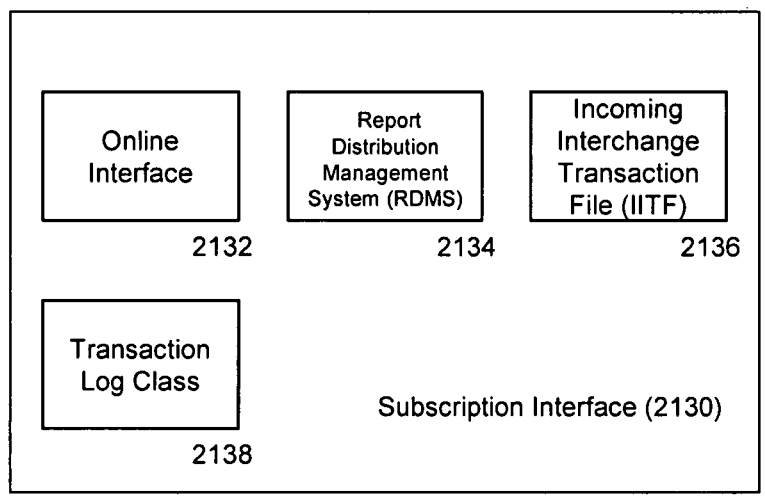

As shown in FIG. 2B, subscription interface 2130 may further comprise an online interface 2132, a report distribution management system (RDMS) 2134, an incoming interchange transaction file (IITF) 2136, and transaction log class 2138. Online interface 2132 allows issuers subscription interface 2130 to communicate via network interface 2200. Report distribution management system 2134 facilitates report distribution to issuers 1300. Incoming interchange transaction file 2136 is a delivery mechanism of such a report. Transaction log class 2138 creates a log file of reports generated by distribution engine 2120. These structures may be implemented as hardware, firmware, or software encoded on a computer readable medium, such as storage media 2300. The functions of these elements are described further below.

Processor 2100 interfaces with storage medium 2300, network interface 2200, card transceiver/scanner 2500, and, in some embodiments, mobile telephony interface 2400. The data processor 2102 enables processor 2100 to locate data on, read data from, and writes data to, these components.

Network interface 2200 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2200 allows payment processor 2000 to communicate with issuer 1300, and may allow communication with acquirer 1200.

Computer-readable storage medium 2300 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, transistor-based memory or other computer-readable memory device as is known in the art for storing and retrieving data. Significantly, computer-readable storage medium 2300 may be remotely located from processor 2100, and be connected to processor 2100 via a network such as a local area network (LAN), a wide area network (WAN), or the Internet. In addition, as shown in FIG. 2, storage media 5300 may also contain cardholder database 2310. Note that in some embodiments, cardholder database may be located at merchant 1100, acquirer 1200, payment processor 2000, or issuer 1300.

Card transceiver/scanner 2500 may be any component known in the art capable of read/writing data to or from payment devices 100. For example, for conventional credit card 100a or mini-card 100d embodiments, card transceiver/scanner 2500 may read or write to a magnetic strip. Embodiments that communicate with a contactless card 100b, mobile phone 100c, and micro tag/key fob 100e include a wireless transceiver.

Mobile telephony interface 2400 is a wireless phone transceiver capable of communicating with mobile phone payment devices 100c. Wireless phone transceivers may communicate with any wireless telephony system known in the art. Such systems include, but are not limited to: digital cellular and personal communication systems (PCS). Message formats include, but are not limited to Enhanced Data Rates for Global Evolution (EDGE), General Packet Radio Service (GPRS) Wireless Internet (WAP), or any other mobile telephony standard known in the art.

The function of these structures may best be understood with respect to FIGS. 3-7, as described below.

Figure 3:
FIG. 3 is table showing an embodiment configured to store tags of information on a payment card or device.

FIG. 3 depicts a data field 55 (also referred to as "Field 55"), constructed and operative in accordance with an embodiment of the present invention. Field 55 is a memory field on payment device 100 configured to store specific transaction information. In some embodiments, the memory field is in a computer chip within payment device 100. Although implementations of Field 55 may vary in size, in some embodiments may be limited to a maximum of 255 bytes of data. One of the features of Field 55 is the ability to allow unique personalization values in the authorization messages. These values are also known as tags (also known as "data elements") in support of contactless transactions. Field 55 tags may include data embedded in the chip that the issuer requests to receive in the authorization message.

In one embodiment of Field 55, the Field 55 data elements may include: amount authorized 3010 (tag 9F02), unpredictable number 3020 (9F37), application transaction count (ATC) 3030 (tag 9F36), issuer application data (IAD) 3040 (tag 9F10), application cryptogram 3050 (tag 9F26), customer exclusive data 4000 (tag 9F7C), and form factor identifier 6000 (tag 9F6E). Tag 97FC carries customer exclusive data that issuer 1300 receives in an authorization request message during contactless transactions. For the purposes of this application, we need only address customer exclusive data 4000 and form factor identifier 6000.

A data parser 2112 associated with the fraud prevention engine is configured to parse and address the Field 55 data tags. In some embodiments, data parser 2112 further performs editing, storage, distribution, monitoring, and reporting functions.

Tag 9F7C (customer exclusive data 4000) is configured to allow transport and storage of a number of different issuer and cardholder specific information.

The data stored in Field 55 may be stored in any format known in the art. Some tag embodiments, as shown in FIGS. 4A and 4B store customer exclusive data 4000 and other data fields in Tag-Length-Value format, in accordance with an embodiment of the present invention. Tags 4100 indicate the position of the information, length 4200 indicates the length of the information, and a data field 4300 carries the information.

Figure 5:
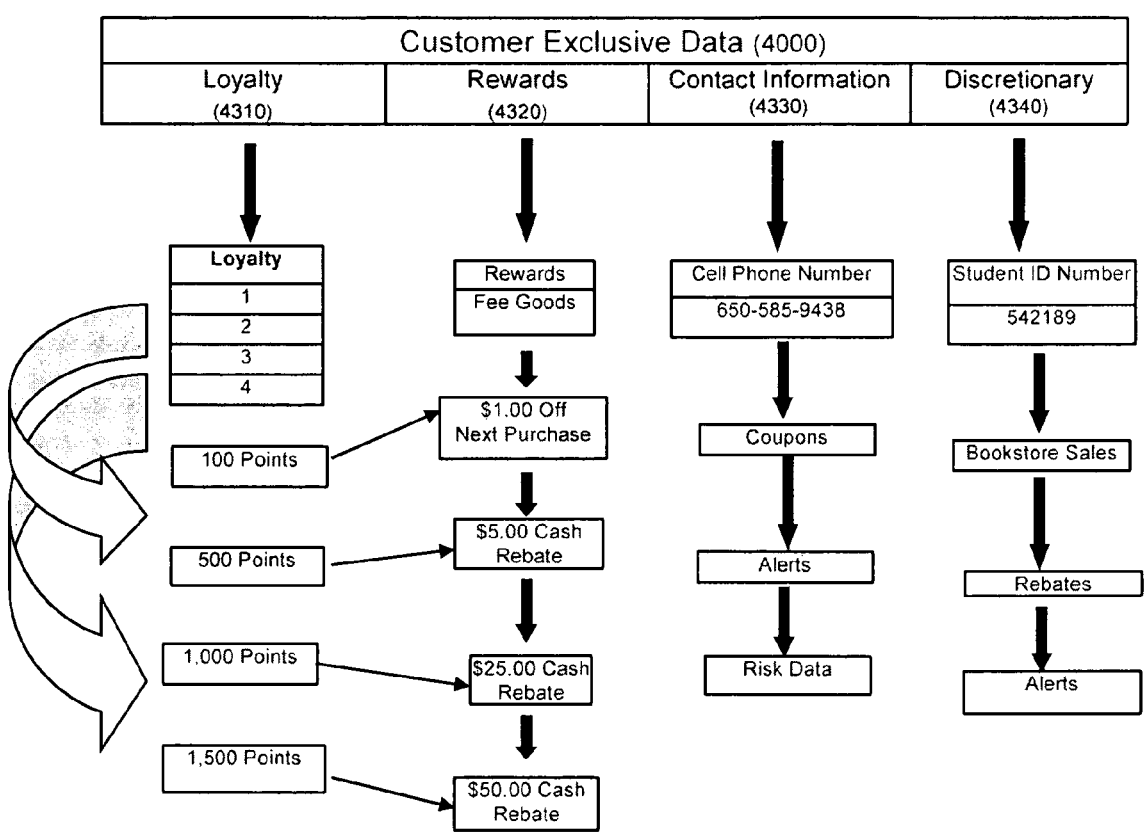
FIG. 5 illustrates examples of customer exclusive data storage on a payment card or device.

FIG. 5 illustrates examples of customer exclusive data 4000, in accordance with an embodiment of the present invention.

Examples of customer exclusive data 4000 include, but are not limited to:

Loyalty and Coupons 4100
  Instant information regarding coupons to customers while in the check out line at specific merchants.
Rewards 4320
  Instant reward information or after the fact rewards and rebates based on marketing campaigns.
  Provides flexibility that enables immediate rewards experience for the customer or following a promotional period.
Alerts and Contact Information 4330
  Available for cardholders who desire immediate knowledge of purchases over specific amounts or transactions conducted in any country.
  Will provide the avenue necessary to establish contact with the cardholder at the point of sale, or thereafter, thus providing the capability to provide coupons, rewards, alerts, etc.
  Mode of contact will utilize currently operational telephony systems and databases.
Other types of Data including issuer discretionary data 4340
  Risk Data
  Student ID
  Drivers License Number
  Passport Number
  Social Security Number
  Library Card
  Grocery club card or store card
  Frequent Flyer Number
  Hotel Rewards Number
  Alternate Cell Phone
  E-Mail Address
  Birthday
  Zip Code
  Name of Pet
  Type of Pet
  Vehicle Information
  Gas Card
  Travel Preferences
  Shopping Preferences Customer exclusive data 4000, as well as additional metrics, may be made available to the issuers 1300 via reports, which may be accessed on a subscription basis.

FIG. 6 illustrates a table showing device form factor information 6000 embodiment configured to identify the payment form factor used in a payment transaction, constructed and operative in accordance with an embodiment of the present invention. As shown, device indicator value 6000 reserves values contemplating use of full-size standard non-contactless payment cards 100a, a full-size contactless payment card 100b, a standard non-contactless mini card 100d, a contactless mini-card, a micro tag 100e, mobile device 100c, and alternate card users. It is understood that device indicator value 6000 embodiments may include some or all of such form factors.

Figure 7A:
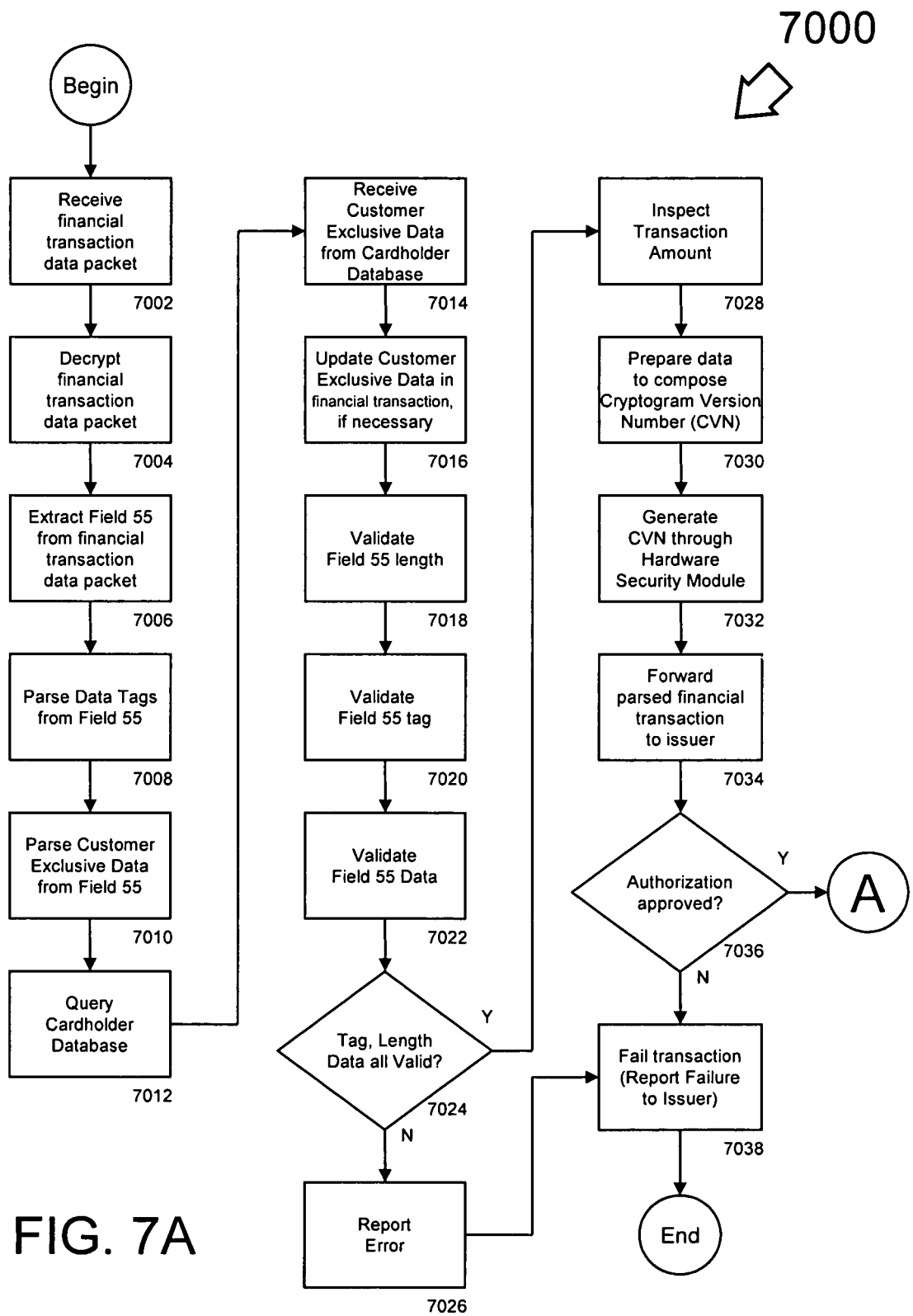
FIGS. 7A-7B flow chart a process in which customer exclusive data from a payment card or device is parsed in a financial transaction.
Figure 7B:
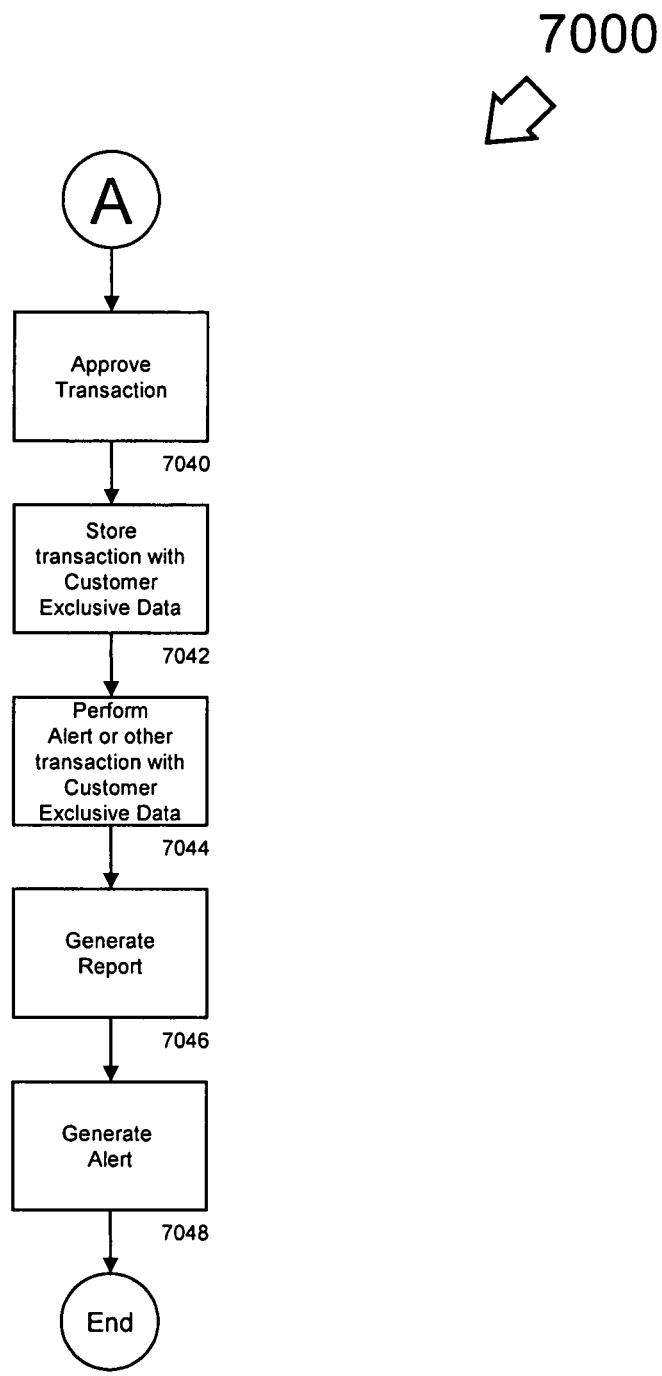

We now turn our attention to a method 7000 embodiment of the present invention, FIGS. 7A-7B. It is understood by those known in the art that instructions for such method embodiments may be stored on their respective computer-readable memory 2300 and executed by their respective processors 2100.

FIGS. 7A-7B are a flow chart describing the parsing or use of customer exclusive data 4000 in a financial transaction, in accordance with an embodiment of the present invention. For the purposes of this example, it is assumed that the customer exclusive data 4000 is parsed by payment processor 2000.

As mentioned above, cardholders initiate a purchase or another financial transaction at a merchant 1100 when they use the payment device 100 at a merchant 1100. Merchant 1100 contacts an acquirer 1200 to determine whether the consumer is credit worthy or the account has sufficient funds on the card to pay for the transaction. The contact is made through a financial data packet which encapsulates the details of the payment transaction, including the type and amount of the financial transaction, the cardholder's primary account number (PAN), and customer exclusive data 4000. The financial data packet may also include unpredictable number 3020, application cryptogram 3050, and/or form factor identifier 6000. In some embodiments, the financial data packet may contain the field 55 contents of the cardholder's payment device 100.

Acquirer 1200 forwards the financial data packet to payment processor 2000 for processing.

At block 7002, network interface 2200 receives the financial transaction data packet from acquirer 1200. If the financial transaction data packet is encrypted, it is decrypted by a hardware decryption module (HDM) or the like, block 7004.

Data parser 2112 extracts field 55 from the financial data packet at block 7006, and parses the field 55 data tags, block 7008.

As field 55 data tags are stored in Tag Length Value format, customer exclusive data 4000 tag is parsed from field 55, block 7010.

Customer data manager 2116 queries cardholder database 2310 to see if any customer exclusive data 4000 is associated with the primary account number, block 7012. The associated customer exclusive data 4000 is retrieved from the cardholder database 2310, block 7014.

In most instances, customer exclusive data 4000 stored at payment device 100 is assumed to be static and encoded during issuance of the payment device 100. Consequently, any customer exclusive data 4000 within the cardholder database 2310 is assumed to be more recent and therefore more accurate. However, in some embodiments, in particular those embodiments in which payment devices 100 have updated customer exclusive data 4000, the cardholder database 2310 may be updated from the transaction. Regardless, when the cardholder database 2310 contains more recent customer exclusive data 4000, customer data manager 2116 updates the financial transaction data packet, block 7016.

The field 55 taken from the financial transaction data packet is validated for expected length, tag, and data, blocks 7018, 7020, and 7022.

If the tag, length, and data are valid, as determined by data parser 2112 at block 7024, process 7000 continues at block 7028.

If the tag, length, and data are invalid, as determined by data parser 2112 at block 7024, an error is reported to alert monitor 2118 and subscription interface 2130 at block 7026. The financial transaction is failed, and both the acquirer 1200 and the issuer 1300 are informed of the failure at block 7038.

At block 7028, fraud prevention engine 2110 inspects the amount and nature of the financial transaction, and prepares the data to compose a cryptogram version number (CVN), block 7030. The cryptogram version number is generated through the hardware security module, block 7032. The cryptogram version number, as applied in the transaction, is compared to another cryptogram version number computed by the hardware security module. If the two cryptogram version numbers do not match, there is a high likelihood of a fraudulent transaction. The cryptogram version number mismatch is reported to the issuer 1300, which has the ability to approve or decline based on its own fraud mitigation strategy.

The parsed financial transaction is forwarded to the issuer 1300 for authorization at block 7034. In some embodiments, where Stand In Processing ("STIP processing") is used, payment processor 2000 may act as the authorizing agent for issuer 1300.

If authorization fails, as determined at decision block 7036, the financial transaction is failed, and both the acquirer 1200 and the issuer 1300 are informed of the failure at block 7038.

If the authorization is granted, the acquirer 1200 is informed that the authorization has been approved, block 7040.

The transaction is logged in cardholder database 2310 with the customer exclusive data 4000 by transaction log class 2138, block 7042.

Customer exclusive data 4000 may be used to add value to a financial transaction, block 7044. In some embodiments, the customer exclusive data 4000 may be used in a rewards loyalty program. Such a rewards loyalty program may improve account retention through strengthening relationships with existing customers, and increase account activity with fewer delinquencies. Additionally, a rewards program provides a strong point of competitive market differentiation. Examples of a reward include:

Offering immediate discounts or promotional points (e.g., "frequent flier" points) for payment device use.

Presenting a cardholder loyalty or rewards information based on the card customer exclusive data or database customer exclusive data. Such a presentation may occur through an alert or mailing, as discussed below.

Birthday, anniversary and holiday promotions based on dates stored in the customer exclusive data 4000.

Loyalty, rewards, and coupons based upon the discretionary data discussed above.

Reports summarizing cardholder use data and the results of any promotion associated with customer exclusive data are generated by a report management distribution system 2134, block 7046.

If cardholders subscribe to any alerts, alerts are generated at block 7048. An alert may be any communication known in the art, such as: telephone call, short message service (SMS) message, electronic mail, or instant messaging known in the art. In some embodiments, the alert may be sent via traditional post/mail, as is known in the art. As discussed above, alerts may be generated for cardholders who desire immediate knowledge of purchases over specific amounts or transactions conducted in any country, for issuers that want cardholder challenge information to verify cardholder identity, and other Will provide the avenue necessary to establish contact with the cardholder at the point of sale, or thereafter, thus providing the capability to provide coupons, rewards, alerts, etc.

Mode of contact will utilize currently operational telephony systems and databases.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method of processing a financial transaction associated with a financial transaction data packet, the method comprising:

receiving at a payment processor the financial transaction data packet from an acquirer, the financial transaction data packet including an amount associated with the financial transaction, a primary account number, and customer exclusive data, wherein the customer exclusive data includes issuer and user-specific information, wherein the customer exclusive data includes loyalty, rewards, contact or discretionary data;

extracting via the payment processor a data field from the financial transaction data packet, the data field formatted in Tag-Length-Value format;

parsing via the payment processor a data tag from the data field;

extracting via the payment processor the customer exclusive data from the data tag;

extracting via the payment processor the primary account number from the financial transaction data packet;

querying via the payment processor a user database with the primary account number to determine whether there is a database customer exclusive data associated with the primary account number;

comparing via the payment processor the customer exclusive data with the database customer exclusive data;

substituting via the payment processor the customer exclusive data with the database customer exclusive data during the financial transaction when the customer exclusive data and the database customer exclusive data do not match, wherein substituting the customer exclusive data with the database customer exclusive data includes updating the customer exclusive data in the financial transaction data packet with the database customer exclusive data.

2. The method of claim 1, wherein the data tag is Field 55.

3. The method of claim 2, wherein the customer exclusive data is a data element within Field 55.

4. The method of claim 3, wherein the customer exclusive data is stored in a particular data element location within Field 55.

5. The method of claim 1, further comprising:
presenting via the payment processor a user loyalty or rewards information based on the customer exclusive data or database customer exclusive data.

6. The method of claim 1, further comprising:
generating via the payment processor a report from the financial transaction with the database customer exclusive data.

7. The method of claim 1, further comprising:
storing via the payment processor information from the financial transaction with the database customer exclusive data in a log.

8. A payment processing system for processing a financial transaction, comprising:

a user database in a non-transitory computer-readable storage medium configured to store customer account information, the customer account information containing a primary account number;

a network interface configured to receive a financial transaction data packet from an acquirer, the financial transaction data packet including an amount associated with the financial transaction, the primary account number, and customer exclusive data, wherein the customer exclusive data includes issuer and user-specific information, wherein the customer exclusive data includes loyalty, rewards, contact or discretionary data;
a data parser configured to extract a data field from the financial transaction data packet, the data field formatted in Tag-Length-Value format; the data parser further configured to parse a data tag from the data field, extract the customer exclusive data from the data tag, and extract a primary account number from the financial transaction data packet;
a customer data manager configured to query the user database with the primary account number to determine whether there is a database customer exclusive data associated with the primary account number, the customer data manager further configured to compare the customer exclusive data with the database customer exclusive data and to substitute the customer exclusive data with the database customer exclusive data during the financial transaction when the customer exclusive data and the database customer exclusive data do not match, wherein substituting the customer exclusive data with the database customer exclusive data includes updating the customer exclusive data in the financial transaction data packet with the database customer exclusive data.

9. The system of claim 8, wherein the data tag is Field 55.

10. The system of claim 9, wherein the customer exclusive data is a data element within Field 55.

11. The system of claim 10, wherein the customer exclusive data is stored in a particular data element location within Field 55.

12. The system of claim 10, further comprising:
an alert monitor configured to present a user loyalty or rewards information based on the customer exclusive data or database customer exclusive data.

13. The system of claim 10, further comprising:
a subscription interface configured to generate a report from the financial transaction with the database customer exclusive data.

14. The system of claim 10, further comprising:
a subscription interface configured to store information from the financial transaction with the database customer exclusive data in a log.

15. A non-transitory computer-readable medium, encoded with data and instructions, that when executed by a computing-device causes the computing device to:
receive a financial transaction data packet from an acquirer, the financial transaction data packet including an amount associated with the financial transaction, a primary account number, and customer exclusive data, wherein the customer exclusive data includes issuer and user-specific information, and wherein the customer exclusive data includes loyalty, rewards, contact or discretionary data;
extract a data field from the financial transaction data packet, the data field formatted in Tag-Length-Value format;
parse a data tag from the data field;
extract the customer exclusive data from the data tag;
extract the primary account number from the financial transaction data packet;
query a user database with the primary account number to determine whether there is a database customer exclusive data associated with the primary account number;
compare the customer exclusive data with the database customer exclusive data;
substitute the customer exclusive data with the database customer exclusive data during the financial transaction when the customer exclusive data with and the database customer exclusive data do not match, wherein substituting the customer exclusive data with the database customer exclusive data includes updating the customer exclusive data in the financial transaction data packet with the database customer exclusive data.

16. The computer-readable medium of claim 15, wherein the data tag is Field 55.

17. The computer-readable medium of claim 16, wherein the customer exclusive data is a data element within Field 55.

18. The computer-readable medium of claim 17, wherein the customer exclusive data is stored in a particular data element location within Field 55.

19. The method of claim 1, wherein the substituting the customer exclusive data with the database customer exclusive data occurs during the processing of the financial transaction.

20. The method of claim 15, wherein the customer exclusive data includes data associated with loyalty, rewards, contact, or discretionary data and wherein the customer exclusive data is substituted with the database customer exclusive data during processing of the financial transaction.

21. The alert monitor of claim 12, wherein alerts are generated for transactions involving purchases over a specific amount.

* * * * *